United States Patent
Lirette

[15] 3,664,135
[45] May 23, 1972

[54] POLLUTION CONTROL AND COOLING DEVICE FOR EXHAUST SYSTEMS

[72] Inventor: Odrey J. Lirette, 125 York, Belle Chasse, La. 70037

[22] Filed: Sept. 14, 1970

[21] Appl. No.: 71,767

[52] U.S. Cl. ............................ 60/310, 261/78 A, 261/116
[51] Int. Cl. ................................................ F01n 3/04
[58] Field of Search .............. 60/30 R, 30 L; 261/76, 78 A, 261/115, 116, 118

[56] References Cited

UNITED STATES PATENTS

| | | | |
|---|---|---|---|
| 1,941,545 | 1/1934 | Eichenberg | 261/115 |
| 2,631,019 | 3/1953 | Yates | 261/118 |
| 2,709,335 | 5/1955 | Vactor | 60/30 L |
| 3,032,969 | 5/1962 | Barnes | 60/30 |
| 3,485,040 | 12/1969 | Niskanen | 60/30 L |
| 3,518,816 | 7/1970 | Jalma | 261/116 |
| 3,524,630 | 8/1970 | Marion | 261/78 A |

*Primary Examiner*—Douglas Hart
*Attorney*—C. Emmett Pugh

[57] ABSTRACT

Exhaust cooling system for a marine engine which prevents any heat corrosion deterioration of the exhaust pipe and elminates substantially all air pollution from the exhaust; the system includes a water spray element immediately adjacent to the exhaust manifold which injects spiraling divergent, crossing water sprays about 360° of the element's circumference at the very beginning of the exhaust system by means of a basic wafer structure interposed between and in line with the manifold and the exhaust pipe; two embodiments are disclosed, one designed for insertion between flanges and the other for insertion between a screw thread/flange joint; the water sprays cool down the exhaust sufficient to allow touching of the exhaust pipe throughout its length and absorb practically all of the solid pollutants in the exhaust fumes.

4 Claims, 10 Drawing Figures

PATENTED MAY 23 1972

INVENTOR.
ODREY J. LIRETTE
BY C. Emmett Pugh
ATTORNEY

POLLUTION CONTROL AND COOLING DEVICE FOR EXHAUST SYSTEMS

BACKGROUND OF THE INVENTION

The present invention relates to the cooling and the cleaning of the exhaust fumes from engines, particularly marine engines, by means of a coolant fluid such as water.

One of the acute and expensive maintenance problems facing engine operators, particularly marine engines aboard moderate size vessels, has been the need to regularly and often replace the exhaust pipes because of corrosion and deterioration caused by the hot exhaust fumes. These exhaust lines or pipes usually have to be completely replaced 2 or 3 times a year for a vessel in the regular use causing considerable expense, trouble and down-time of the power plant. Typical examples of such moderate size vessels are shrimp and commercial fishing boats and the offshore crew boats for the oil industry in the Gulf Coast region.

It is old in the art to use a fluid coolant such as water to cool the exterior of the manifold and exhaust structure by means of an outer cooling jacket; an example of such a system is disclosed in the patent to Benjamen, U.S. Pat. No. 3,169,365. It is also old to inject water into the exhaust pipe line itself for cooling purposes; an example of such a system being shown in the patent to Bartlow, U.S. Pat. No. 3,050,934. However, none of the prior art systems, although perhaps successful in somewhat cooling the exhaust, have eliminated or indeed for that matter even substantially diminished the problem of pipe deterioration, nor have they been completely successful in eliminating the air pollutants from the exhaust or in fully cooling the exhaust.

It is thus a basic object of the present invention to completely eliminate any deterioration of the exhaust pipe due to corrosion caused by the heated exhaust and to prevent any air pollution by the existing exhaust. The present invention accomplishes this basic object by injecting the cooling water directly into the exhaust system at the area immediately adjacent the manifold and at the very beginning of the exhaust pipeline and further by causing a complete dispersion of the water throughout the cross-sectional area of the pipeline by means of a series of relatively fine sprays.

As generally noted in FIG. 9, prior art systems which had direct intermixing of the water and the exhaust injected the water at a point 1 downstream from the beginning 2 of the exhaust pipeline and moreover usually injected the water as a solid, single stream. Such prior art systems allowed the exhaust pipe to still become very hot and rapidly deteriorate. Indeed, injecting the water in a solid stream enhanced the corrosion of the exhaust pipe particularly at or near the point of impact of the water stream, adding to the deterioration problem.

Moreover, dispersing the water throughout the cross-section of the exhaust pipe by the fine, divergent sprays of the present invention does such a complete cooling job on the exhaust that the exhaust pipe throughout its entire length is cool enough to be comfortable to the human touch. This is in direct contradistinction to the prior art where the exhaust pipelines present serious safety hazards because of their blistering temperatures.

DESCRIPTION OF THE PREFERRED EMBODIMENTS

Figure 1:
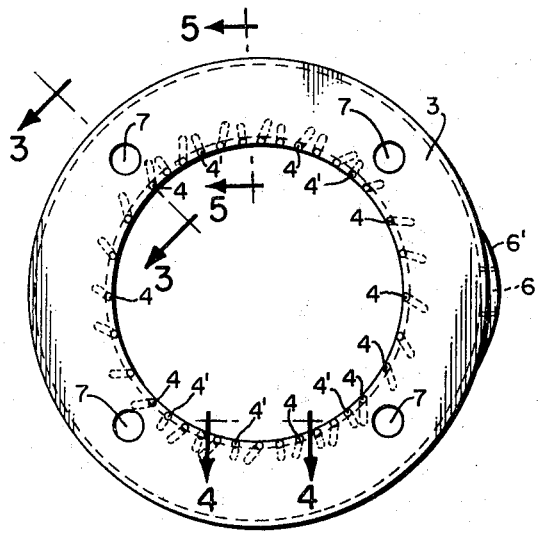
FIG. 1 is a front view from the downstream side of a first embodiment of the present invention.
Figure 2:
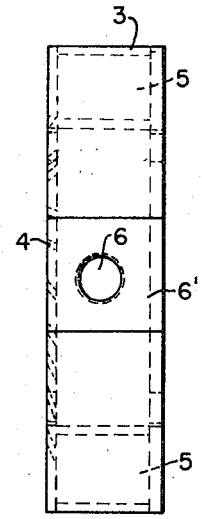
FIG. 2 is a top, plan view of the embodiment of FIG. 1.

As illustrated in FIGS. 1 and 2, the present invention is embodied in a circular wafer or washer-shaper body 3 having a series of divergent spray holes 4—4' along its inner periphery. The basic body 3 of the device includes an inner chamber 5 and has a thickness substantially less than its outer diameter. Because of its configuration, the device is readily included within the standard engine exhaust system and does not require any special elbow connections or the like.

Water is fed into the inner chamber 5 by means of inlet orifice 6 and leaves the chamber 5 by means of the divergent spray apertures 4—4'.

Figure 7:
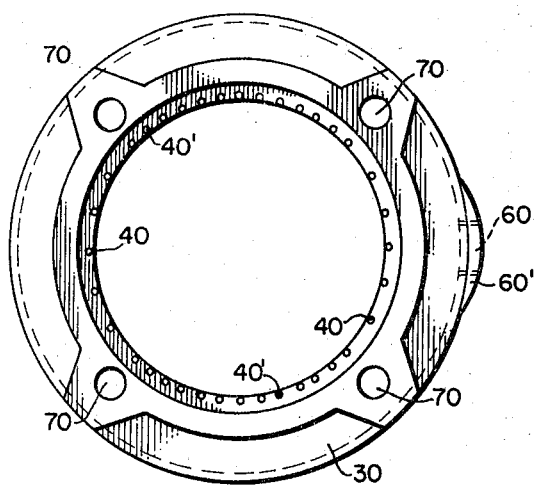
FIG. 7 is a front view from the down-stream side of the second embodiment of the invention.
Figure 8:
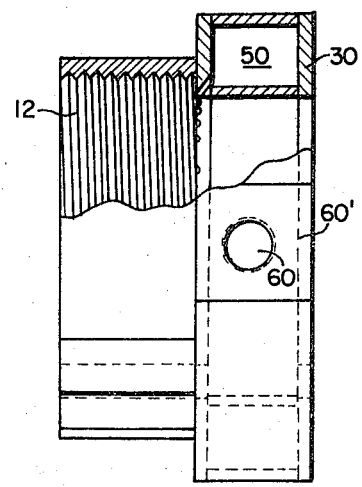
FIG. 8 is a top, plan view, partially cut away, of the second embodiment.
Figure 9:
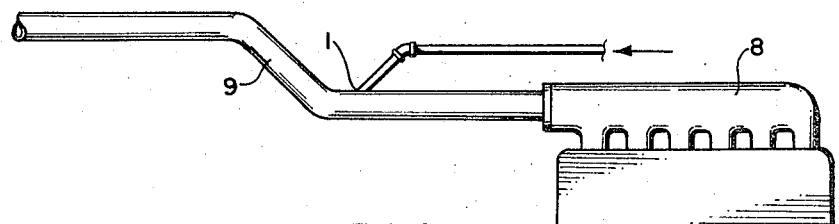
FIGS. 9 and 10 are general, side views of the exhaust cooling systems of the prior art and present invention, respectively, showing particularly the relative placement of the water injecting means.

Bolt holes 7 are provided about the periphery of the body 3 for inserting the device between the manifold 8 and the exhaust pipe 9 when each terminates in the standard flange. On the other hand, if the exhaust pipe terminates with screw threads 10, the embodiment of FIGS. 6–8 is used.

Figure 6:
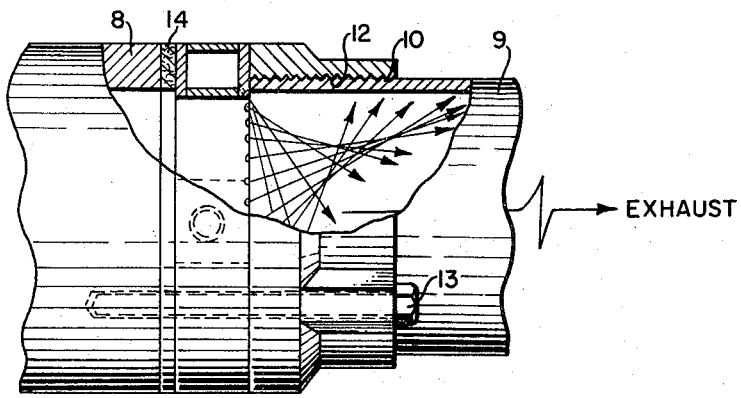
FIG. 6 is a side view, partially cut-away, of a second embodiment of the present invention installed between the engine manifold and the exhaust line.

In the second embodiment both bolt holes 70 about the periphery as well as screw threads 12 are provided, so that as illustrated in FIG. 6 the device is screw-threaded 10–12 to the exhaust pipe 9 and bolted to the manifold 8 by means of bolts 13.

It is noted that both embodiments function identically, the only variation being in the means provided to attach the device between the manifold and the exhaust system.

Because of the functional and operational identity, the elements of the second embodiment are numbered like the analogous elements of the first embodiment but with a zero added. The functional and structural details of the two embodiments will be discussed together.

Figure 3:
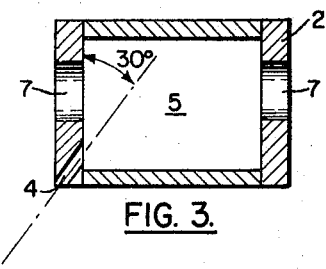
FIGS. 3, 4 and 5 are cross-sectional views taken along section lines 3—3, 4—4 and 5—5, respectively, of FIG. 1.
Figure 4:
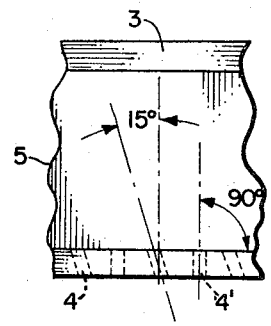
Figure 5:
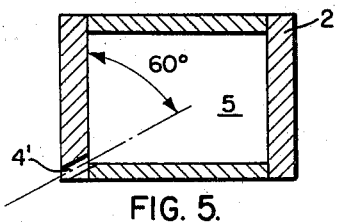
Figure 10:
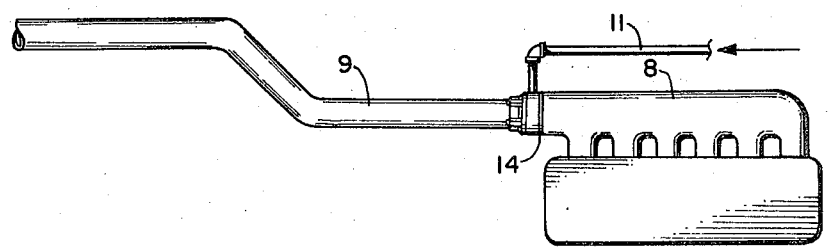

As generally illustrated in FIG. 10, water is fed from a pump to the cooling system lead-in pipe 11. With the device inserted immediately after the manifold 8 at the entrance to the exhaust line 9, the lead-in pipe 11 feeds water via inlet orifice 6/60 into the inner chamber 5/50. The water is then sprayed out by means of spray holes 4—4'/40—40' in divergent sprays (note arrows in FIG. 6) throughout the cross-section of the inlet to the exhaust pipeline 9. In order to obtain the crossing and divergent spray pattern and to insure full coverage across the entire cross-section of the inlet of the exhaust pipe 9, the main spray holes 4/40 which make a 30° angle (note FIG. 3) with the plane of the wafer body 3/30 are supplemented by additional, interspersed spray holes 4'/40' which make a 60° angle (note FIG. 5 with the plane of the wafer body 3/30. In order to give a spiralling effect or pattern to the main sprays 4/40 and further insure the intermixing and full-coverage of the sprays, the main spray holes 4/40 are rather than radial, off-set to the side at an angle of 15° (note FIG. 4) from the plane intersecting at 90° the plane of the wafer body 3/30.

The interaction of the spiraling 30° main sprays 4/40 and the supplemental 60°, radial auxilliary sprays 4'/40' provide a solid, fine spray wall of substantial depth fully intersecting the exhaust as it emanates from the manifold 8. As a result the exhaust fumes are immediately and cooled down to the point where the exhaust pipe 9 is cool to the touch with no danger of burning. As a further result nearly all the solid pollutants in the fumes are condensed out and absorbed by the water so that at the exit of the exhaust pipe 9 there is no material air pollution. It is estimated that approximately 95 percent of the pollutants are so removed.

Moreover, because the water is interjected by means of peripheral sprays directed inwardly, i.e., toward the central inner core, there is no obstruction between the manifold outlet and the inlet of the exhaust pipeline 9. The exhaust gases flow freely and do not directly contact any metal surfaces.

For the purposes of illustration, typical dimensions for the device as applied to the standard GM diesel engine, models 271 through 671, will be given. As applied to the first embodiment (FIGS. 1-2) of the device and to the wafer portion of the second embodiment (right hand portion of FIG. 8), the body of the device could be made of one-eighth inch fired brass and have an outer diameter of 6 and 6/16 inches, an inner diameter of 4 inches and a thickness of 1 and ⅝ inches. A total of 22 main spray holes 4/40 spread equally about the inner periphery of the device and having a diameter of three thirty-seconds inches have been found to be satisfactory. A total of two sets of six supplemental spray holes 4'/40' of three thirty-seconds inches diameter equally interspersed with the main spray holes 4/40 on opposite sides of the device likewise has been found to be satisfactory. In order to strengthen the body 3/30 of the device at the point where inlet orifice 6/60 is placed, faired reinforcement 6' /60' having a three-sixteenths of an inch thickness at its highest point is added to the main body 3/30. Appropriate insulating and sealing gaskets are added at the interfaces of the device and around the bolt holes 7/70. A standard asbestos gasket 14 is for example shown between the device and the manifold 8 (note FIGS. 6 and 10).

Because of the greater cooling effect of the present invention, the user also saves insulation covering costs which previously were necessary because of the safety hazard of people being severely burned by an uncovered exhaust pipe. The cooling system of the present invention also results in quiter operation serving in part as a muffler.

Although the system has been found particularly useful for marine internal combustion engines, it also could be used in other applications and with other engines.

Because the invention is capable of many different embodiments and of being practiced and carried out in various ways, it should be understood that the invention is not limited in its application to the details and arrangement of parts illustrated in the accompanying drawings. It should also be understood that the phraseology or terminology employed herein is merely for the purpose of description and not of limitation, and it is not intended to limit the invention claimed herein beyond the requirements of the prior art.

What is claimed for invention is:

1. A fluid exhaust cooling and pollution limiting device for an engine exhaust system having an engine manifold and a metal exhaust pipeline comprising:

a basic, generally circular, wafer-shaped body defining at its center an open, cylindrical, central core portion clear of any structural projections, the outer diameter of said wafer-shaped body being substantially greater than the thickness of said body;

two sets of a series of inwardly and generally centrally directed coolant fluid spray apertures disposed symetrically and regularly about the entire inner periphery of said open central core portion;

the first set of said series of spray apertures being directed inwardly each in a radial plane;

the second set of said series of spray apertures being directed inwardly but each off-set from its corresponding radial plane to create a spiral spray pattern and directed outwardly a limited amount to create an outwardly converging spray pattern; said first and second sets of spray apertures lying along a circular line in the same plane;

manifold connecting means on one side of said wafer-shaped basic body for directly connecting said one side of said wafer-shaped basic body to the manifold in face-to-face relationship;

exhaust pipeline connecting means on the opposing side of said basic wafer-shaped body for directly connecting said opposing side of said basic body to the exhaust pipeline in face-to-face relationship;

exhaust inlet means on said one side for mating with the manifold exhaust outlet when said basic body is connected to said manifold; and exhaust outlet means on said opposing side for mating with the exhaust pipeline inlet when said basic body is connected to said exhaust pipeline, said open central core portion directly connecting said exhaust inlet means and said exhaust outlet means; whereby exhaust emanating from the manifold immediately comes into juxtaposition to said spray apertures before it enters said exhaust pipeline and said spray apertures provide a solid, fine intersecting spray wall of substantial depth.

2. The device of claim 1 wherein said first set of spray apertures is also directed outwardly a limited amount in the same general, but different, direction as said second set of spray apertures to likewise create an outwardly converging spray pattern.

3. The device of claim 2 wherein said first set of spray apertures is directed outwardly at approximately an angle of thirty degrees, said second set of spray apertures is offset approximately 15° from their radial planes and directed outwardly approximately 60°.

4. The device of claim 1 wherein all of said spray apertures are located at and through one of the bottom edges of said wafer-shaped body.

* * * * *